(12) United States Patent
Norris

(10) Patent No.: US 8,087,083 B1
(45) Date of Patent: Dec. 27, 2011

(54) SYSTEMS AND METHODS FOR DETECTING A NETWORK SNIFFER

(75) Inventor: Edward James Norris, Lancaster, MA (US)

(73) Assignee: Verizon Laboratories Inc., Waltham, MA (US)

( * ) Notice: Subject to any disclaimer, the term of this patent is extended or adjusted under 35 U.S.C. 154(b) by 1192 days.

(21) Appl. No.: 10/267,629

(22) Filed: Oct. 9, 2002

Related U.S. Application Data

(60) Provisional application No. 60/345,434, filed on Jan. 4, 2002.

(51) Int. Cl.
  *G06F 12/14* (2006.01)
  *G06F 12/16* (2006.01)
  *G06F 21/06* (2006.01)

(52) U.S. Cl. .............. 726/24; 726/23; 726/25; 726/22; 726/2; 713/154; 713/153; 713/150; 709/224; 709/220; 709/206

(58) Field of Classification Search .............. 726/22–24
See application file for complete search history.

(56) References Cited

U.S. PATENT DOCUMENTS

| | | | | |
|---|---|---|---|---|
| 4,719,566 A * | 1/1988 | Kelley | ............. | 340/5.27 |
| 5,835,726 A * | 11/1998 | Shwed et al. | ............. | 709/229 |
| 6,363,489 B1 * | 3/2002 | Comay et al. | ............. | 726/22 |
| 6,405,318 B1 * | 6/2002 | Rowland | ............. | 726/22 |
| 6,438,695 B1 * | 8/2002 | Maufer | ............. | 726/11 |
| 6,687,833 B1 * | 2/2004 | Osborne et al. | ............. | 726/23 |
| 6,738,814 B1 * | 5/2004 | Cox et al. | ............. | 709/225 |
| 6,859,841 B2 * | 2/2005 | Narad et al. | ............. | 709/236 |
| 6,880,090 B1 * | 4/2005 | Shawcross | ............. | 726/14 |
| 6,996,843 B1 * | 2/2006 | Moran | ............. | 726/23 |
| 7,010,604 B1 * | 3/2006 | Munger et al. | ............. | 709/227 |
| 7,107,347 B1 * | 9/2006 | Cohen | ............. | 709/229 |
| 7,124,440 B2 * | 10/2006 | Poletto et al. | ............. | 726/23 |
| 7,277,404 B2 * | 10/2007 | Tanzella et al. | ............. | 370/310 |
| 7,360,250 B2 * | 4/2008 | Miyagawa et al. | ............. | 726/23 |
| 7,549,166 B2 * | 6/2009 | Baffes et al. | ............. | 726/23 |
| 7,581,113 B2 * | 8/2009 | Smith et al. | ............. | 713/184 |
| 2002/0042883 A1 * | 4/2002 | Roux et al. | ............. | 713/201 |
| 2002/0046351 A1 * | 4/2002 | Takemori et al. | ............. | 713/201 |
| 2002/0078384 A1 * | 6/2002 | Hippelainen | ............. | 713/201 |
| 2002/0112190 A1 * | 8/2002 | Miyagawa et al. | ............. | 713/201 |
| 2002/0133717 A1 * | 9/2002 | Ciongoli et al. | ............. | 713/201 |
| 2002/0162017 A1 * | 10/2002 | Sorkin et al. | ............. | 713/201 |
| 2002/0184528 A1 * | 12/2002 | Shevenell et al. | ............. | 713/201 |
| 2003/0084349 A1 * | 5/2003 | Friedrichs et al. | ............. | 713/201 |
| 2003/0135762 A1 * | 7/2003 | Macaulay | ............. | 713/201 |
| 2004/0103307 A1 * | 5/2004 | Raphaeli et al. | ............. | 713/201 |
| 2004/0107285 A1 * | 6/2004 | Larson et al. | ............. | 709/229 |
| 2004/0117478 A1 * | 6/2004 | Triulzi et al. | ............. | 709/224 |
| 2004/0234056 A1 * | 11/2004 | Heilmann et al. | ............. | 379/196 |
| 2005/0071684 A1 * | 3/2005 | Sorkin et al. | ............. | 713/201 |
| 2005/0120237 A1 * | 6/2005 | Roux et al. | ............. | 713/200 |
| 2005/0125195 A1 * | 6/2005 | Brendel | ............. | 702/182 |
| 2007/0061883 A1 * | 3/2007 | Lyle et al. | ............. | 726/23 |

(Continued)

OTHER PUBLICATIONS

Microsoft "Microsoft Computer Dictionary 5th Edition" (2002) Microsoft Press. p. 256 "honeypot".*

(Continued)

*Primary Examiner* — Syed A. Zia

(57) ABSTRACT

A device (110) records traffic in a communications network. The device (110) monitors traffic received by the device (110) and determines whether the received traffic is unexpected. The device (110) records the traffic when the traffic is determined to be unexpected.

21 Claims, 8 Drawing Sheets

U.S. PATENT DOCUMENTS

2007/0115993 A1* 5/2007 Cohen .......................... 370/392
2008/0104700 A1* 5/2008 Fagone et al. ................... 726/22
2011/0067107 A1* 3/2011 Weeks et al. .................... 726/23

OTHER PUBLICATIONS

Spitzner, Lance "Know Your Enemy: A Forensic Analysis" (May 2000) http://www.enteract.com/~Ispitz/papers.html.*

P. E. McKenney, D.Y. Lee, B.A. Denny "Traffic Generator Software Release Notes" (Sep. 1998) SRI International and 2Com Corp.*

Spitzner, Lance, "Honeypots", http://www.enteract.com/ ~Ispitz, Mar. 8, 2002, 9 pages.

"Know Your Enemy: Honeynets", Honeynet Project, http://project.honeynet.org, Jan. 14, 2002, 9 pages.

* cited by examiner

SYSTEMS AND METHODS FOR DETECTING A NETWORK SNIFFER

RELATED APPLICATION

This application claims priority under 35 U.S.C. §119 based on U.S. Provisional Application No. 60/345,434, filed Jan. 4, 2002, the disclosure of which is incorporated herein by reference.

FIELD OF THE INVENTION

The present invention relates generally to communications systems and, more particularly, to systems and methods for detecting when a communications network has been compromised.

BACKGROUND OF THE INVENTION

Network attacks represent a major threat to the continuous operation of network devices. In a typical buffer overflow attack, for example, traffic emanates from an attacking device to a network device vulnerable to software errors. The packet exceeds the memory resources that were allocated for the packet, thus corrupting the additional space on the network device. The exceeded space may corrupt system allocated space. An intruder may attempt to have code executed when the packet exceeds its allocated space. Some buffer overflows can lead to a compromise of the vulnerable network space.

Once a network device has been compromised, the intruder may begin running a network sniffer. The intruder may configure the network sniffer to look for user name/password combinations or other information of interest destined to network servers. Once this information is obtained, the intruder's ability to attack the network servers is facilitated. Because these network sniffers act in passive mode (i.e., they monitor traffic, but do not alter it), they are often very difficult to detect.

Therefore, there exists a need for systems and methods that improve the ability to detect network sniffers.

SUMMARY OF THE INVENTION

Systems and methods consistent with the present invention address this and other needs by providing a mechanism that improves network security and enhances a network administrator's ability to detect network sniffers.

In accordance with the purpose of this invention as embodied and broadly described herein, a method for recording traffic in a communications network is disclosed. The method includes monitoring traffic received by a device and determining whether the received traffic is unexpected. The method further includes recording the traffic when the traffic is determined to be unexpected.

In another implementation consistent with the present invention, a communications network includes at least one first device and a second device. The first device generates first packets and transmits the first packets. The second device receives a packet, determines whether the received packet includes one of the first packets, and stores the received packet when the received packet does not include one of the first packets.

In yet another implementation consistent with the present invention, a computer-readable medium containing instructions for controlling at least one processor to perform a method for recording traffic in a communications network is disclosed. The method includes receiving traffic, determining whether the received traffic is unexpected based on at least one of a source of the traffic and a time at which the traffic was received, and recording the traffic when the traffic is unexpected.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the present invention provide a security device for aiding in the detection of network sniffers. A honeypot traffic agent transmits traffic of interest, such as authentication traffic, to a honeypot. An intruder running a network sniffer may capture this traffic and, in response, attempt to communicate with the honeypot. When unexpected authentication traffic arrives at the honeypot, the network administrator becomes immediately aware that the network environment has been compromised and that the intruder is running a network sniffer.

Exemplary System

Figure 1:
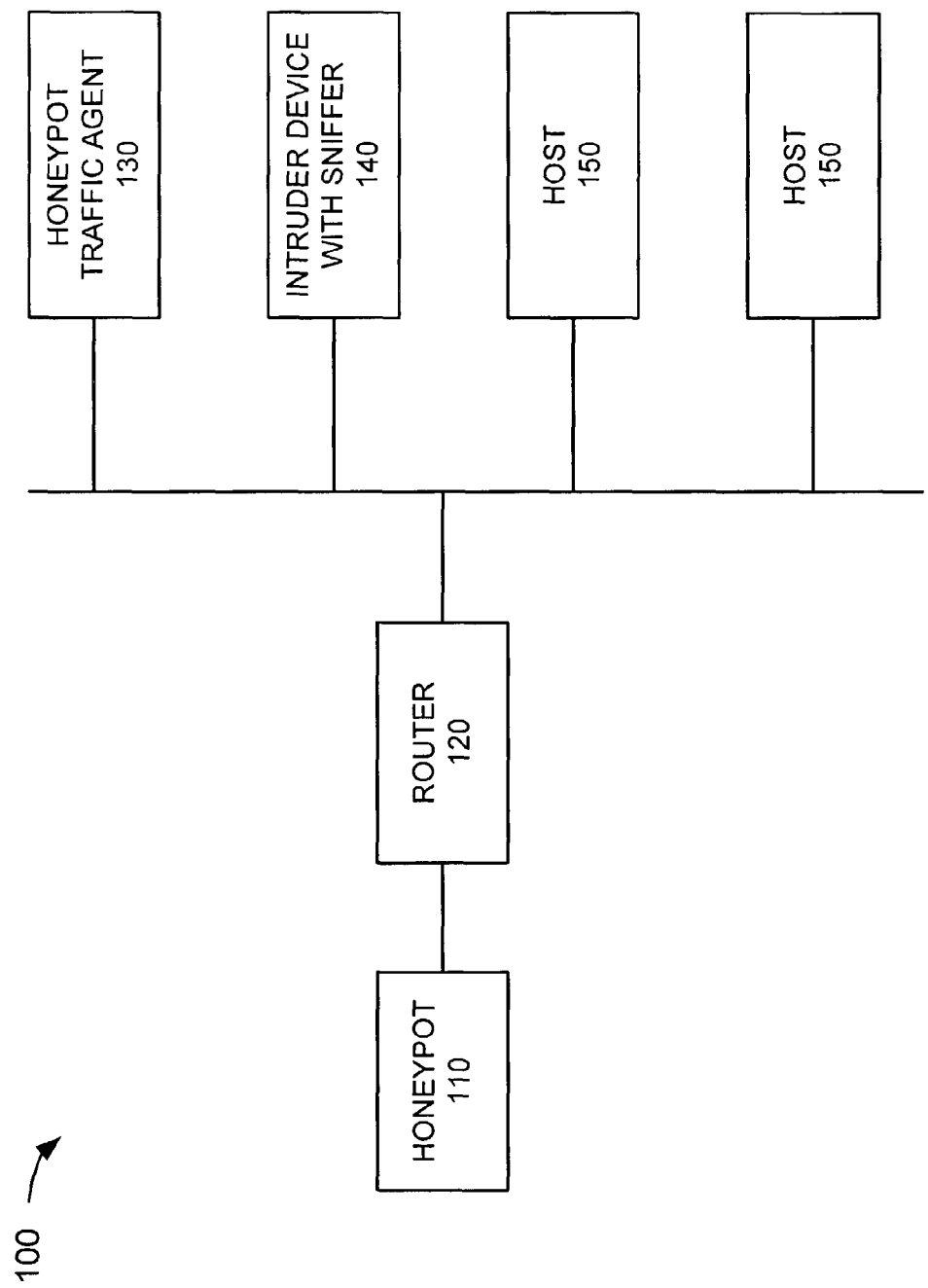
FIG. 1 illustrates an exemplary system in which systems and methods consistent with the present invention may be implemented.

FIG. 1 illustrates an exemplary system 100 in which systems and methods, consistent with the present invention, may be implemented. System 100 includes a honeypot 110, a router 120, a honeypot traffic agent 130, an intruder device 140, and a group of host devices 150. The number of components illustrated in FIG. 1 has been shown for simplicity. It will be appreciated that a typical system may include more or fewer components than illustrated in FIG. 1. Moreover, the components illustrated in FIG. 1 may be connected via one or more networks, such as the Internet, an intranet, a wide area network (WAN), a local area network (LAN), or other similar types of networks using any conventional communication protocol.

Honeypot 110 is a security device in which all unexpected traffic directed to the honeypot is considered hostile. In one implementation, honeypot 110 emulates a network device, such as a host device, providing one or more network services. When unexpected traffic is directed to honeypot 110, honeypot 110 records the traffic for later analysis. Honeypot 110 may also sound an alarm when unexpected traffic is detected.

Router 120 may include any conventional routing device that transmits traffic from a first device to a second device in a well-known manner. Router 120 may be part of a network (not shown), such as the Internet, an intranet, a WAN, a LAN, or other similar types of networks. In the exemplary configuration illustrated in FIG. 1, router 120 is capable of routing traffic from honeypot traffic agent 130, intruder device 140, or host devices 150 to honeypot 110.

Honeypot traffic agent 130 may include any device or combination of devices capable of transmitting traffic to honeypot 110. In one implementation consistent with the present invention, honeypot traffic agent 130 transmits façade or "advertisement" packets to honeypot 110 in an attempt to direct intruder devices running sniffers to honeypot 110. The advertisement packets may include authentication information (e.g., user name/password combinations) to network services located on honeypot 110. Advertisement packets can be used for any protocol in which user name/password combinations are sent, such as telnet, pop3, ftp, or the like.

Intruder device 140 may include a host device that has been compromised by a network intruder or any other device capable of performing network attacks. In one implementation consistent with the present invention, intruder device 140 includes a network sniffer that monitors data traveling to and from router 120. Intruder device 140 and honeypot 110 may be located on the same network or different networks. Hosts 150 may include any conventional host device, such as a server.

Figure 2:
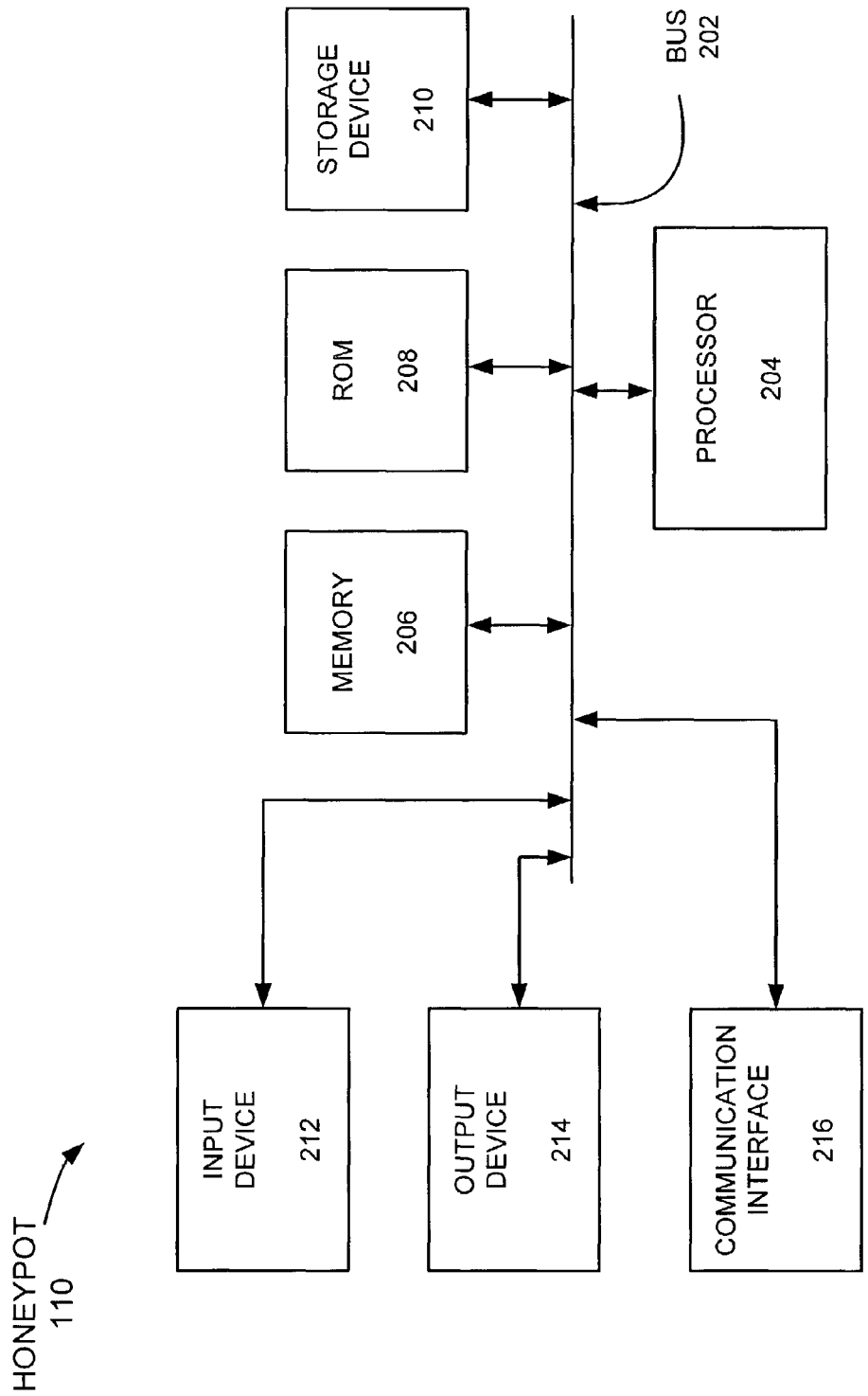
FIG. 2 illustrates an exemplary configuration of the honeypot of FIG. 1.

FIG. 2 illustrates an exemplary configuration of honeypot 110 of FIG. 1. As illustrated, honeypot 110 includes a bus 202, a processor 204, a main memory 206, a read only memory (ROM) 208, a storage device 210, an input device 212, an output device 214, and a communication interface 216. Bus 202 permits communication among the components of honeypot 110.

Processor 204 may include any type of conventional processor or microprocessor that interprets and executes instructions. Memory 206 may include a random access memory (RAM) or another dynamic storage device (referred to as main memory) that stores information and instructions for execution by processor 204. Main memory 206 may also be used to store temporary variables or other intermediate information during execution of instructions by processor 204.

ROM 208 may include a conventional ROM device and/or another static storage device that stores static information and instructions for processor 204. Storage device 210 may include a magnetic disk or optical disk and its corresponding drive and/or some other type of magnetic or optical recording medium and its corresponding drive for storing information and instructions.

Input device 212 may include one or more conventional mechanisms that permit an operator to input information to honeypot 110, such as a keyboard, a mouse, a pen, one or more biometric mechanisms, such as a voice recognition device, etc. Output device 214 may include one or more conventional mechanisms that output information to the operator, such as a display, a printer, a speaker, etc. Communication interface 216 may include any transceiver-like mechanism that enables honeypot 110 to communicate with other devices and/or systems, such as a network administrator device. For example, communication interface 216 may include a modem or an Ethernet interface to a network. Alternatively, communication interface 216 may include other mechanisms for communicating via a data network.

Honeypot 110 may implement the functions described below in response to processor 204 executing software instructions contained in a computer-readable medium, such as memory 206. A computer-readable medium may be defined as one or more memory devices and/or carrier waves. In alternative embodiments, hardwired circuitry may be used in place of or in combination with software instructions to implement the present invention. Thus, the present invention is not limited to any specific combination of hardware circuitry and software.

Figure 3:
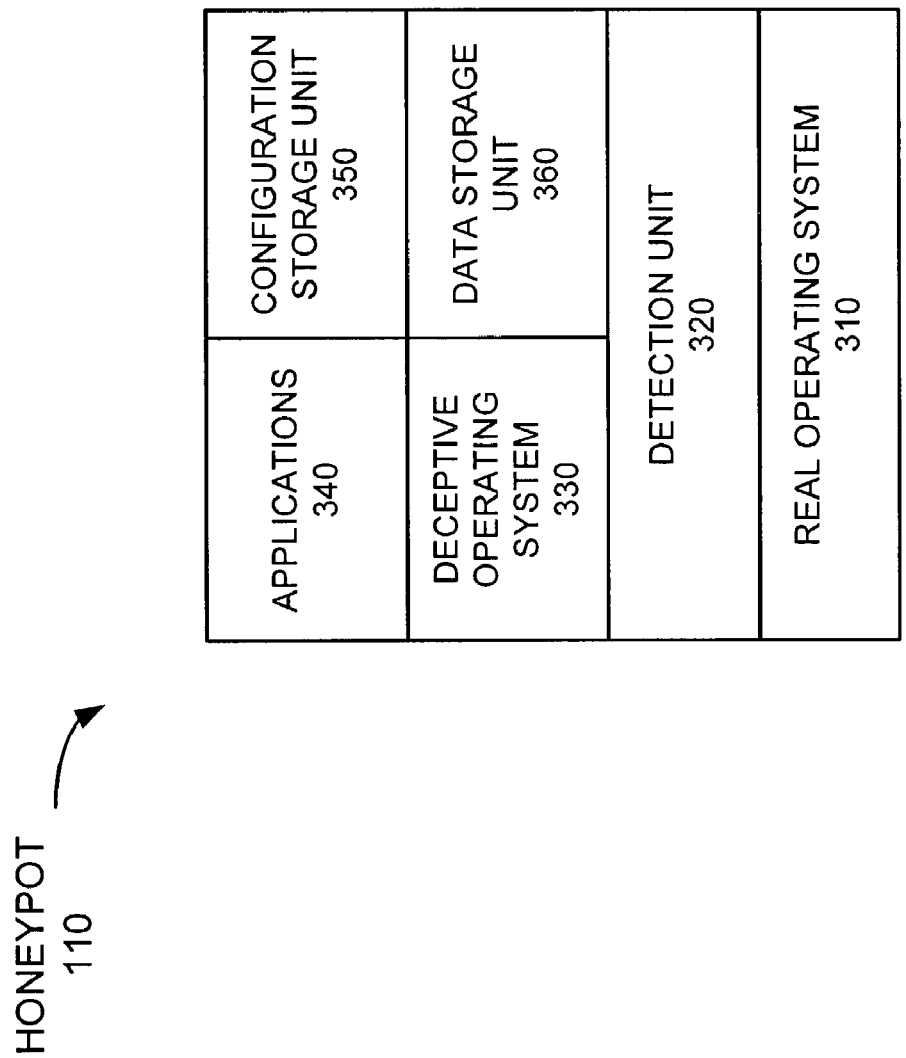
FIG. 3 illustrates an exemplary functional block diagram of the honeypot of FIG. 1.

FIG. 3 illustrates an exemplary functional block diagram of honeypot 110 of FIG. 1. As illustrated, honeypot 110 includes an operating system 310, a detection unit 320, a deceptive operating system 330, applications 340, a configuration storage unit 350, and a data storage unit 360.

Operating system 310 includes the real operating system platform for honeypot 110. In one implementation consistent with the present invention, operating system 310 may be implemented using Solaris as the operating system platform. Other operating systems are possible. Detection unit 320 acts to detect, contain, and monitor intrusions to honeypot 110. As described above, honeypot 110 looks and acts like a network device, though it performs no actual production or operating environment network services. As a result, all unauthorized (or unexpected) activity directed to honeypot 110 is detected by detection unit 320 as a possible intrusion. Detection unit 320 may then record all keystrokes and functions invoked by the intruder. In one implementation consistent with the present invention, detection unit 320 may be implemented using ManTrap® from Symantec Corp.

Deceptive operating system 330 emulates an operating system that may be implemented on one of hosts 150 or another network device in the system 100. Deceptive operating system 330 allows intruders to compromise and interact with deceptive operating system 330 as they would an actual operating system. Applications 340 include applications capable of providing one or more network services. In one implementation, applications 340 are capable of providing network services associated with an authentication (or login) procedure. Similar to deceptive operating system 330, applications 340 allow intruders to compromise and interact with applications 340 as they would actual applications in host devices 150.

Configuration storage unit 350 stores operating system and application configuration data to enable deceptive operating system 330 and applications 340 to emulate network services provided by an actual host 150. This data may include, for example, actual authentication data (i.e., user names and passwords) or false authentication data. Data storage unit 360 may store unexpected traffic captured by honeypot 110 from connections to honeypot 110. Data storage unit 360 may also store the keystrokes and functions executed by an intruder during possible attacks to honeypot 110.

Figure 4:
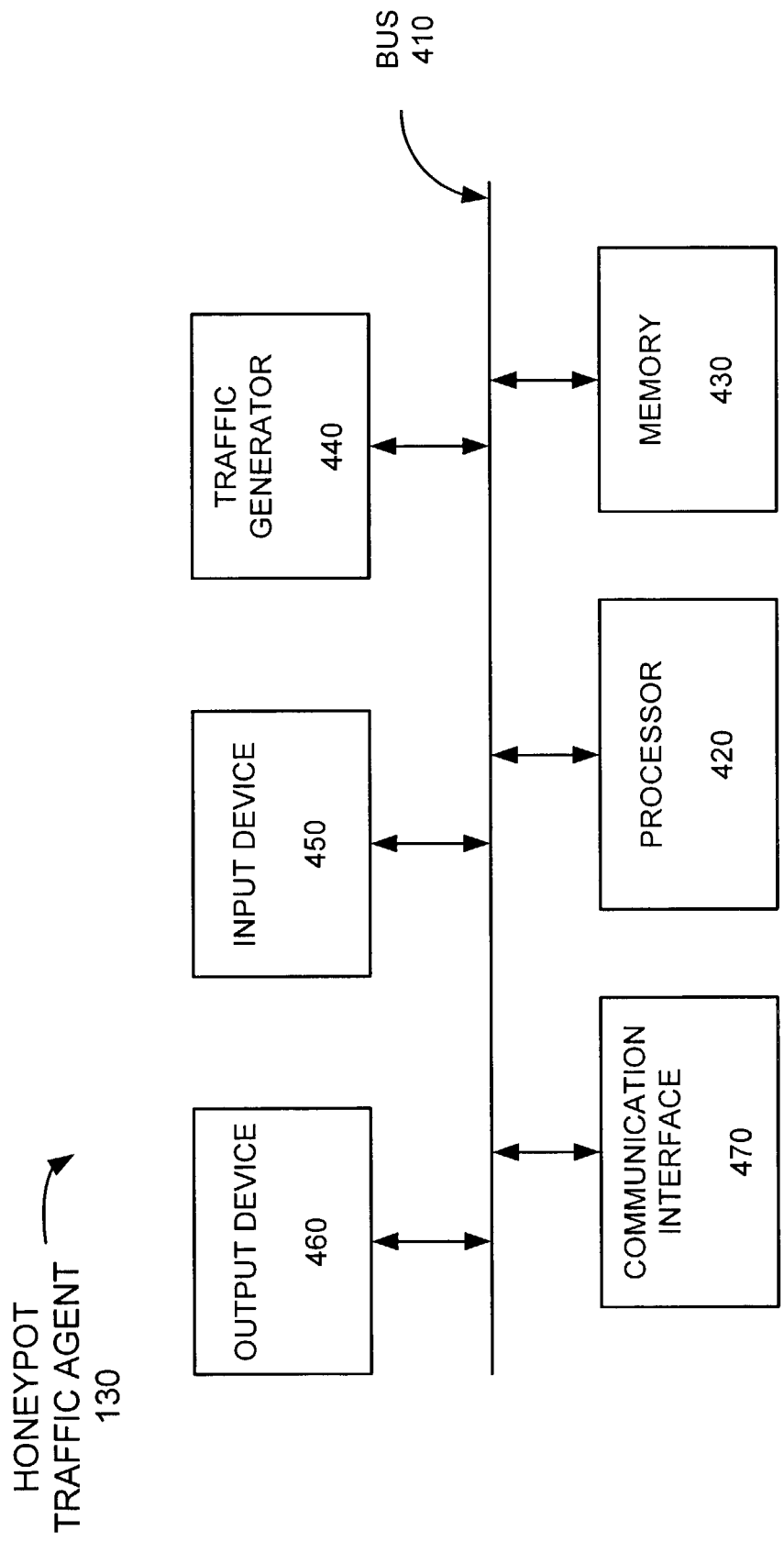
FIG. 4 illustrates an exemplary configuration of the honeypot traffic agent of FIG. 1.

FIG. 4 illustrates an exemplary diagram of honeypot traffic agent 130 in an implementation consistent with the present invention. As illustrated, honeypot traffic agent 130 includes a bus 410, a processor 420, a memory 430, a traffic generator 440, an input device 450, an output device 460, and a communication interface 470. Bus 410 permits communication among the components of honeypot traffic agent 130.

Processor 420 may include any type of conventional processor or microprocessor that interprets and executes instructions. Memory 430 may include a RAM or another dynamic storage device that stores information and instructions for execution by processor 420; a ROM or another type of static storage device that stores static information and instructions for use by processor 420; and/or some other type of magnetic or optical recording medium and its corresponding drive.

Traffic generator 440 may include one or more devices for generating traffic for transmission to honeypot 110. In one implementation, traffic generator 440 generates successful and/or failure authentication traffic. As described above, honeypot traffic agent 130 transmits this traffic to honeypot 110 to entice an intruder sniffing network packets for user name/password combinations destined to network servers. It will be appreciated that other types of traffic that may be of interest to intruders running network sniffers may also be transmitted to honeypot 110. Traffic generator 440 may generate traffic for transmission to honeypot 110 at predetermined or random intervals.

Input device 450 may include one or more conventional mechanisms that permit an operator to input information to honeypot traffic agent 130, such as a keyboard, a mouse, a pen, a biometric mechanism, and the like. Output device 460 may include one or more conventional mechanisms that output information to the operator, including a display, a printer, a speaker, etc. Communication interface 470 may include any transceiver-like mechanism that enables honeypot traffic agent 130 to communicate with other devices and/or systems. For example, communication interface 470 may include mechanisms for communicating with honeypot 110 via a network (FIG. 1).

Figure 5:
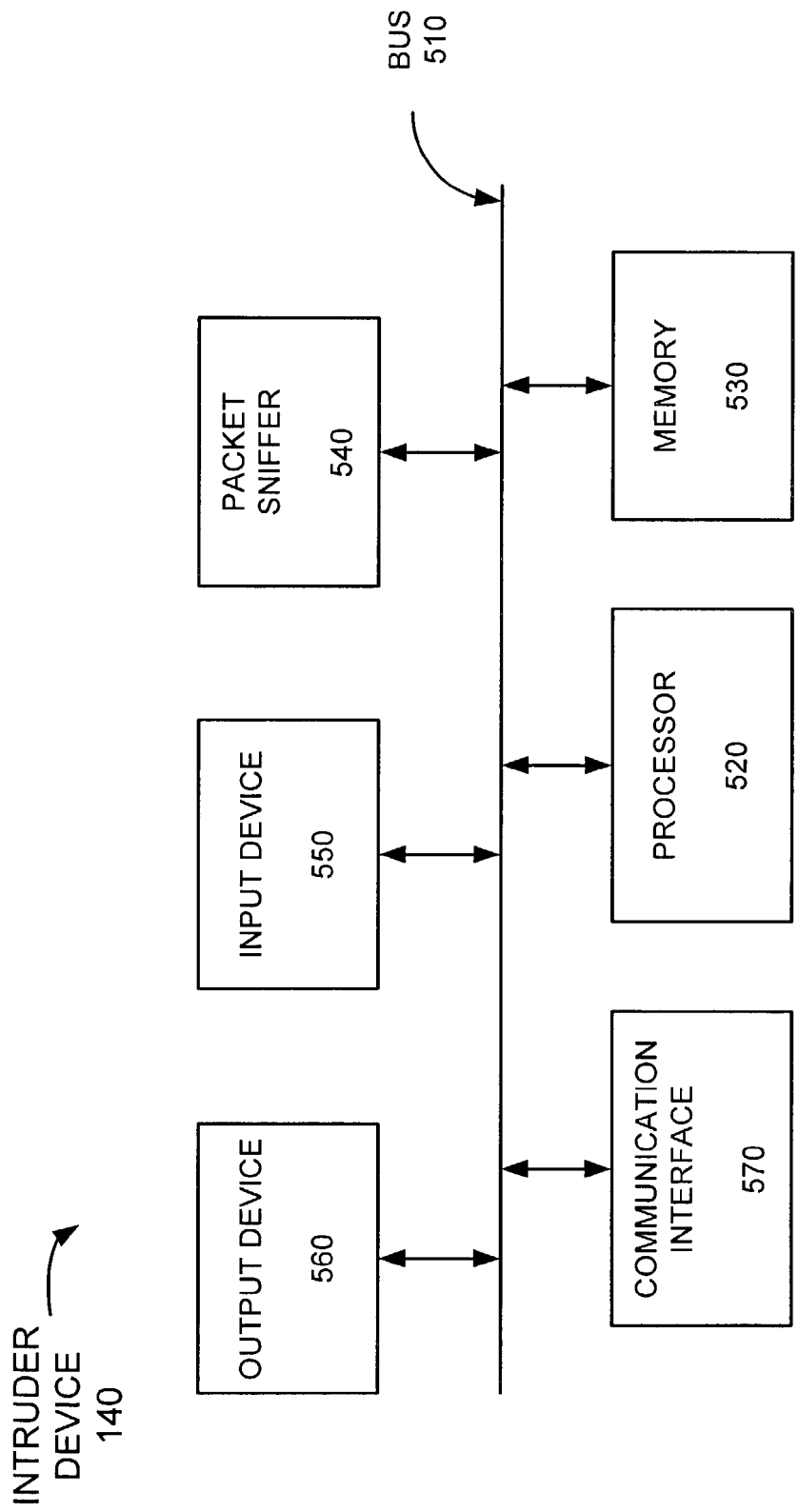
FIG. 5 illustrates an exemplary configuration of the intruder device of FIG. 1.

FIG. 5 illustrates an exemplary diagram of intruder device 140 in an implementation consistent with the present invention. As illustrated, intruder device 140 includes a bus 510, a processor 520, a memory 530, a packet sniffer 540, an input device 550, an output device 560, and a communication interface 570. Bus 510 permits communication among the components of intruder device 140.

Processor 520 may include any type of conventional processor or microprocessor that interprets and executes instructions. Memory 530 may include a RAM or another dynamic storage device that stores information and instructions for execution by processor 520; a ROM or another type of static storage device that stores static information and instructions for use by processor 520; and/or some other type of magnetic or optical recording medium and its corresponding drive.

Packet sniffer 540 may include any conventional device that monitors data transmitted in a network. In one implementation, packet sniffer 540 monitors traffic transmitted through router 120 for user name/password combinations.

Input device 550 may include one or more conventional mechanisms that permit an operator to input information to intruder device 140, such as a keyboard, a mouse, a pen, a biometric mechanism, and the like. Output device 560 may include one or more conventional mechanisms that output information to the operator, including a display, a printer, a speaker, etc. Communication interface 570 may include any transceiver-like mechanism that enables intruder device 140 to communicate with other devices and/or systems. For example, communication interface 570 may include mechanisms that allow intruder device 140 to transmit traffic to honeypot 110 via a network (FIG. 1).

Exemplary Processing

Figure 6:
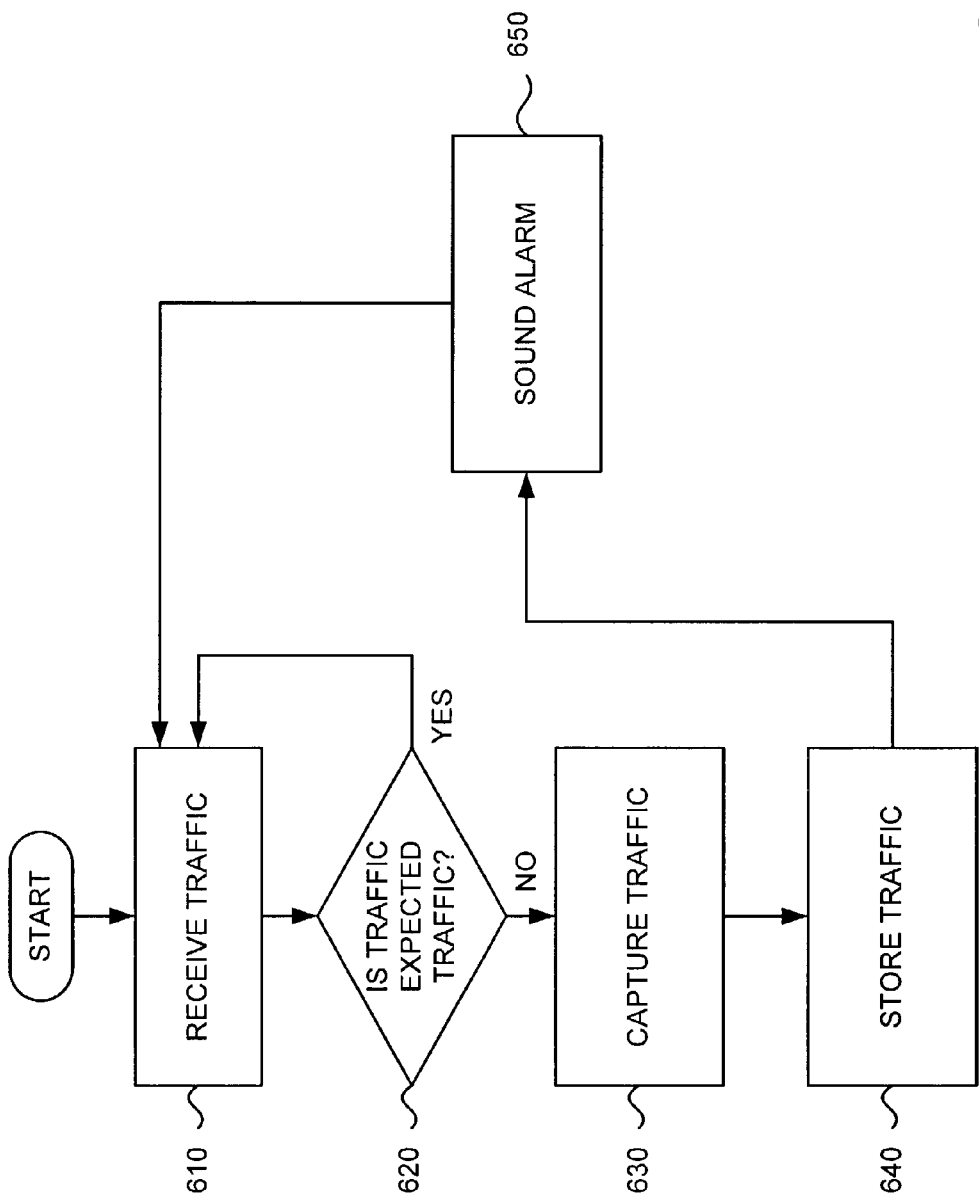
FIG. 6 illustrates an exemplary process for detecting a network sniffer in an implementation consistent with the present invention.
Figure 7:
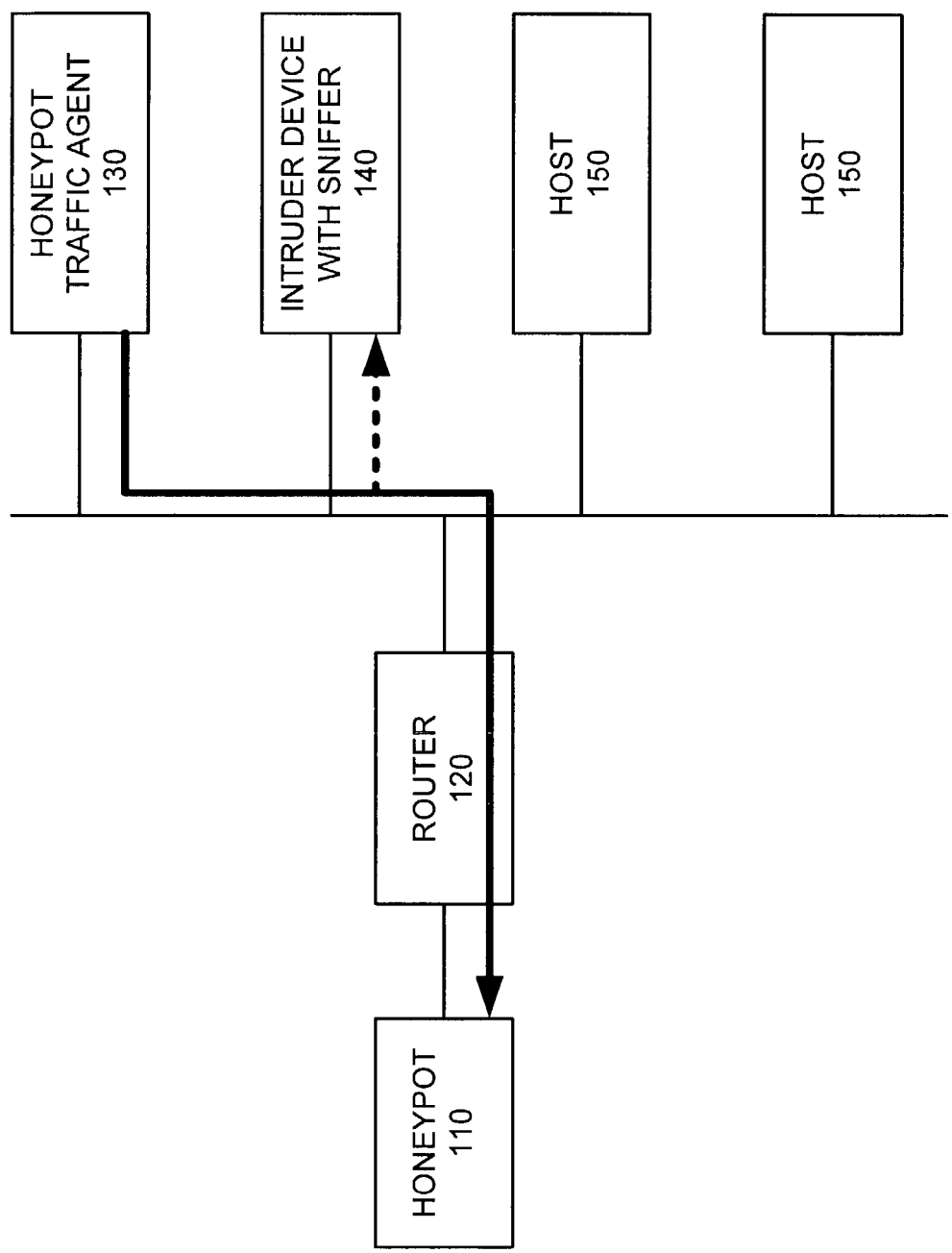
FIG. 7 illustrates an exemplary flow of traffic from the honeypot traffic agent to the honeypot.

FIG. 6 illustrates an exemplary process, performed by honeypot 110, for detecting a network sniffer in an implementation consistent with the present invention. As described above, honeypot traffic agent 130 may transmit advertisement packets to honeypot 110 at predetermined intervals. These advertisement packets may include successful and/or failure authentication information, such as one or more user name/password combinations, or any other type of information that may be of interest to an intruder running a network sniffer. This transmission path is illustrated in FIG. 7.

Figure 8:
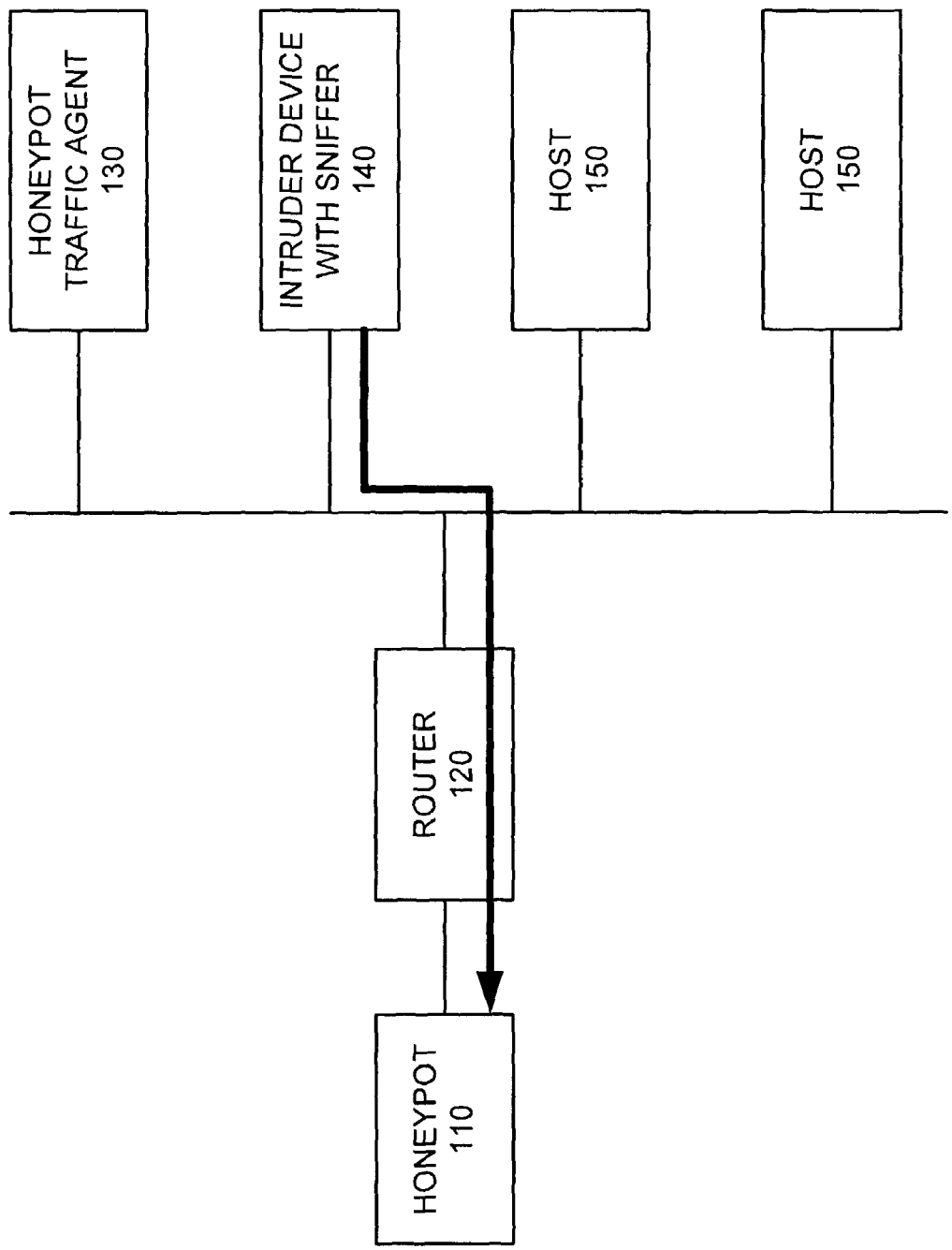
FIG. 8 illustrates an exemplary flow of traffic from the intruder device to the honeypot.

An intruder device, such as intruder device 140, may detect the advertisement packets and attempt to compromise honeypot 110, believing honeypot 110 to be a host device. In response, intruder device 140 may transmit authentication data the intruder believes to be true data to honeypot 110 in an attempt to gain access to the services provided thereby. This transmission path is illustrated in FIG. 8.

Returning to FIG. 6, processing may begin with honeypot 110 receiving network traffic [act 610]. This traffic may include advertisement packets from honeypot traffic generator 130 or authentication data the intruder believes to be true data from one or more intruder devices 140. Upon receipt of traffic, honeypot 110 may determine whether the traffic is expected traffic (i.e., advertisement packets from honeypot traffic generator 130) or unexpected traffic (i.e., any traffic not transmitted by honeypot traffic generator 130) [act 620].

Honeypot 110 may determine that received traffic is expected based on the device from which the traffic is received or the contents of the received traffic. For example, if honeypot 110 receives traffic from a device other than honeypot traffic generator 130, honeypot 110 may classify the traffic as unexpected. If the traffic received by honeypot 110 is not advertisement packets, honeypot 110 may classify the traffic as unexpected. Honeypot 110 may also classify incoming traffic based on the time at which the traffic is received. Honeypot traffic generator 130 may transmit advertisement packets at predetermined intervals. If honeypot 110 receives traffic at a time other than the predetermined time intervals, honeypot 110 may classify the traffic as unexpected. Honeypot 110 may classify traffic as unexpected for other reasons as well.

If honeypot 110 classifies the traffic as expected, honeypot 110 may ignore the traffic and processing may return to act 610. If, on the other hand, honeypot 110 classifies the received traffic as unexpected, honeypot 110 may capture the traffic [act 630]. Honeypot 110 may then store the captured traffic in, for example, data storage unit 360 [act 640]. This data may later be used for analyzing the intrusion or for taking remedial actions.

Honeypot 110 may sound an alarm when unexpected traffic is detected by honeypot 110 [act 650]. Honeypot 110 may notify a network administrator that unexpected traffic has been detected via any conventional technique. For example, honeypot 110 may cause an audible or visual alarm to be presented to the network administrator. Via the above-described processing, when unexpected traffic is detected by honeypot 110, a network administrator may immediately become aware that the network environment has been compromised and that the intruder is running a network sniffer.

CONCLUSION

Systems and methods consistent with the present invention provide a security device for aiding in the detection of network sniffers. A honeypot traffic agent transmits traffic of interest, such as authentication traffic, that may be captured by an intruder running a network sniffer and transmits this traffic to a honeypot. When unexpected authentication traffic arrives at the honeypot, the network administrator becomes immediately aware that the network environment has been compromised and that the intruder is running a network sniffer.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while the above description focused on a honeypot that emulates a host device, the present invention is not so limited. In fact, the honeypot may be configured to emulate any network device.

The above implementations can be implemented in software, hardware, or a combination of software and hardware. Thus, the present invention is not limited to any specific combination of hardware circuitry and software.

While a series of acts has been described with regard to FIG. 6, the order of the acts may be varied in other implementations consistent with the present invention. Moreover, non-dependent acts may be implemented in parallel. No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A security system for aiding in detection of an intruder device running a network sniffer, the security system comprising:
    a honeypot;
    a honeypot traffic agent for transmitting façade advertisement traffic over the network to the honeypot in an attempt to direct said intruder device to said honeypot;
    the honeypot comprising:
        a memory configured to store instructions; and
        a processor configured to execute the instructions to:
            receive the façade advertisement traffic from the honeypot traffic agent;
            receive non-façade traffic from the intruder device;
            determine whether received traffic is the façade advertisement traffic or the non-façade traffic;
            ignore the received traffic if determined to be the façade advertisement traffic; and
            record the received traffic if determined to be the non-façade traffic.

2. The security system of claim 1 wherein, when determining whether the received traffic is the façade advertisement traffic or the non-façade traffic, the processor is configured to:
    determine a source of the received traffic.

3. The security system of claim 1 wherein, when determining whether the received traffic is the façade advertisement traffic or the non-façade traffic, the processor is configured to:
    determine a time at which the received traffic is received.

4. The security system of claim 1 wherein, when determining whether the received traffic is the façade advertisement traffic or the non-façade traffic, the processor is configured to:
    determine a content of the received traffic.

5. The security system of claim 1 wherein, when determining whether the received traffic is the façade advertisement traffic or the non-façade traffic, the processor is configured to:
    determine that the received traffic is non-façade when the source of the received traffic is not the honeypot traffic agent.

6. The security system of claim 1 wherein the processor is further configured to:
    notify a network administrator when the received traffic is determined to be the non-façade traffic.

7. The security system of claim 1 wherein the recorded traffic is subsequently used for intrusion analysis or for taking remedial action.

8. A method for detecting when a communications network has been compromised, the method comprising:
    generating façade traffic from a traffic generator, the façade traffic being transmitted to a honeypot in an attempt to direct intruder devices running sniffers to said honeypot;
    monitoring traffic received by the honeypot, the received traffic including non-façade traffic;
    determining whether the received traffic is the façade traffic or the non-façade traffic;
    ignoring the received traffic if determined to be the façade traffic; and
    recording the received traffic when the received traffic is the non-façade traffic.

9. The method of claim 8 wherein the determining includes:
    determining a source of the received traffic.

10. The method of claim 8 wherein the determining includes:
    determining a time at which the received traffic was received.

11. The method of claim 8 wherein the determining includes:
    determining a content of the received traffic.

12. The method of claim 8 further comprising:
    notifying a network administrator when the received traffic is non-façade traffic.

13. The method of claim 8 further comprising:
    subsequently using the recorded traffic for network compromise analysis or for taking remedial action.

14. The method of claim 12 wherein the notifying includes:
    sounding an alarm.

15. A communications network including network devices that detect operation of a network sniffer, the communications network comprising:
    at least one honeypot traffic agent device configured to:
        generate façade packets only, and
        transmit the façade packets to a honeypot device in an attempt to direct an intruder device running said network sniffer to said honeypot; and
    said honeypot device configured to:
        receive packets which may include at least one of the façade packets,
        determine whether the received packets include the one of the façade packets,
        ignore a received packet when the received packet is the one of the façade packets, and
        store a received packet when the received packet is not the one of the façade packets.

16. The communications network of claim 15 wherein the honeypot device is further configured to:
    alert a network administrator when the received packet is not one of the façade packets.

17. The communications network of claim 15 wherein the at least one honeypot traffic agent device is configured to:
    transmit the façade packets at predetermined time intervals.

18. The communications network of claim 15 wherein each of the façade packets includes authentication information.

19. The communications network of claim 15 wherein each of the façade packets includes at least one user name and password combination.

20. The communications network of claim 15 wherein the stored packet is subsequently used for network sniffer analysis or for taking remedial action.

21. The communications network of claim 17 wherein the honeypot device is further configured to:
    determine whether the received packet was received at one of the predetermined time intervals.

* * * * *